US011936439B2

(12) United States Patent
Matsunaga (10) Patent No.: US 11,936,439 B2
(45) Date of Patent: Mar. 19, 2024

(54) CONTROL DEVICE, CONTROL METHOD, AND COMPUTER-READABLE STORAGE MEDIUM

(71) Applicant: HONDA MOTOR CO., LTD., Tokyo (JP)

(72) Inventor: Hideki Matsunaga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 310 days.

(21) Appl. No.: 17/481,963

(22) Filed: Sep. 22, 2021

(65) Prior Publication Data
US 2022/0014288 A1    Jan. 13, 2022

Related U.S. Application Data

(63) Continuation of application No. PCT/JP2019/014298, filed on Mar. 29, 2019.

(51) Int. Cl.
*H04B 17/373*      (2015.01)
*H04W 4/44*        (2018.01)

(52) U.S. Cl.
CPC ............ *H04B 17/373* (2015.01); *H04W 4/44* (2018.02)

(58) Field of Classification Search
CPC ....... H04W 4/44; H04W 16/24; H04W 52/24; H04W 4/029; H04W 88/02; H04W 28/0226; H04W 28/0231; H04W 28/0236; H04W 40/026; H04W 84/005; H04B 17/345; H04B 17/373; H04B 17/318; H04B 17/336; H04B 17/346
See application file for complete search history.

(56) References Cited

U.S. PATENT DOCUMENTS 8,615,263 B2 * 12/2013 Madon ................. H04W 16/04
                                                       455/431
9,693,357 B2 *  6/2017 Cho ..................... H04W 72/52
                       (Continued)

FOREIGN PATENT DOCUMENTS

CN        103051373 A       4/2013
CN        105071852 A      11/2015
                (Continued)

OTHER PUBLICATIONS

Chinese Office Action for Chinese Patent Application No. 201980094184.3 dated Apr. 24, 2023.
(Continued)

*Primary Examiner* — Hai V Nguyen
(74) *Attorney, Agent, or Firm* — Thomas| Horstemeyer, LLP (57) ABSTRACT

A control device acquires quality information indicating a correspondence relationship between a position and a communication quality related to wireless communication at the position, and route information indicating a scheduled moving route of a terminal device, specifies an area including at least a part of the scheduled moving route among areas in which the communication quality is determined to be lower than a predetermined communication quality on a basis of the quality information and the route information, and executes control for moving a mobile base station to a position where a wireless communication service can be provided in the specified area.

10 Claims, 3 Drawing Sheets

(56) References Cited

U.S. PATENT DOCUMENTS

| | | | | |
|---|---|---|---|---|
| 2012/0259914 A1* | 10/2012 | Ando | ................. | H04W 4/18 |
| | | | | 709/203 |
| 2012/0282962 A1* | 11/2012 | Madon | ................. | H04W 16/04 |
| | | | | 455/509 |
| 2015/0063316 A1* | 3/2015 | Cho | ................. | H04W 72/52 |
| | | | | 370/336 |
| 2016/0363457 A1* | 12/2016 | Jelavic | ............... | G01C 21/3461 |

FOREIGN PATENT DOCUMENTS

| | | | | |
|---|---|---|---|---|
| EP | 3589008 A1 * | 1/2020 | ........... | H04B 7/0413 |
| JP | 2017-195493 A | 10/2017 | | |
| JP | 2017-216663 A | 12/2017 | | |
| WO | 2020/202369 A1 | 10/2020 | | |

OTHER PUBLICATIONS

International Search Report and Written Opinion for PCT/JP2019/014298 dated Jun. 11, 2019.

\* cited by examiner

CONTROL DEVICE, CONTROL METHOD, AND COMPUTER-READABLE STORAGE MEDIUM

CROSS-REFERENCE TO RELATED APPLICATION(S)

This application is a continuation of International Patent Application No. PCT/JP2019/014298 filed on Mar. 29, 2019, the entire disclosures of which is incorporated herein by reference.

BACKGROUND OF THE INVENTION

Field of the Invention

The present invention relates to a communication quality improvement technology of wireless communication.

Description of the Related Art

A remote driving technique in which a vehicle is operated and moved by an operator existing at a remote place is known. In the remote driving, sufficiently suppressing a communication delay between an operator device operated by an operator who performs the remote driving and a terminal device mounted on a vehicle is one of required communication qualities (see PTL1).

CITATION LIST

Patent Literature

PTL1: Japanese Patent Laid-Open No. 2017-216663
In communication for high-quality vehicle traveling control such as remote driving, it is important to ensure sufficient communication quality in a moving route of an in-vehicle terminal device.

SUMMARY OF THE INVENTION

The present invention provides a communication quality improvement technology for providing a moving terminal device with sufficient communication quality.

A control device according to an aspect of the present invention includes: an acquiring unit configured to acquire quality information indicating a correspondence relationship between a position and a communication quality related to wireless communication at the position, and route information indicating a scheduled moving route of a terminal device; a specifying unit configured to specify an area including at least a part of the scheduled moving route among areas in which the communication quality is determined to be lower than a predetermined communication quality on a basis of the quality information and the route information; and a control unit configured to execute control for moving a mobile base station to a position where a wireless communication service can be provided in the specified area.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

(System Configuration)

Figure 1:
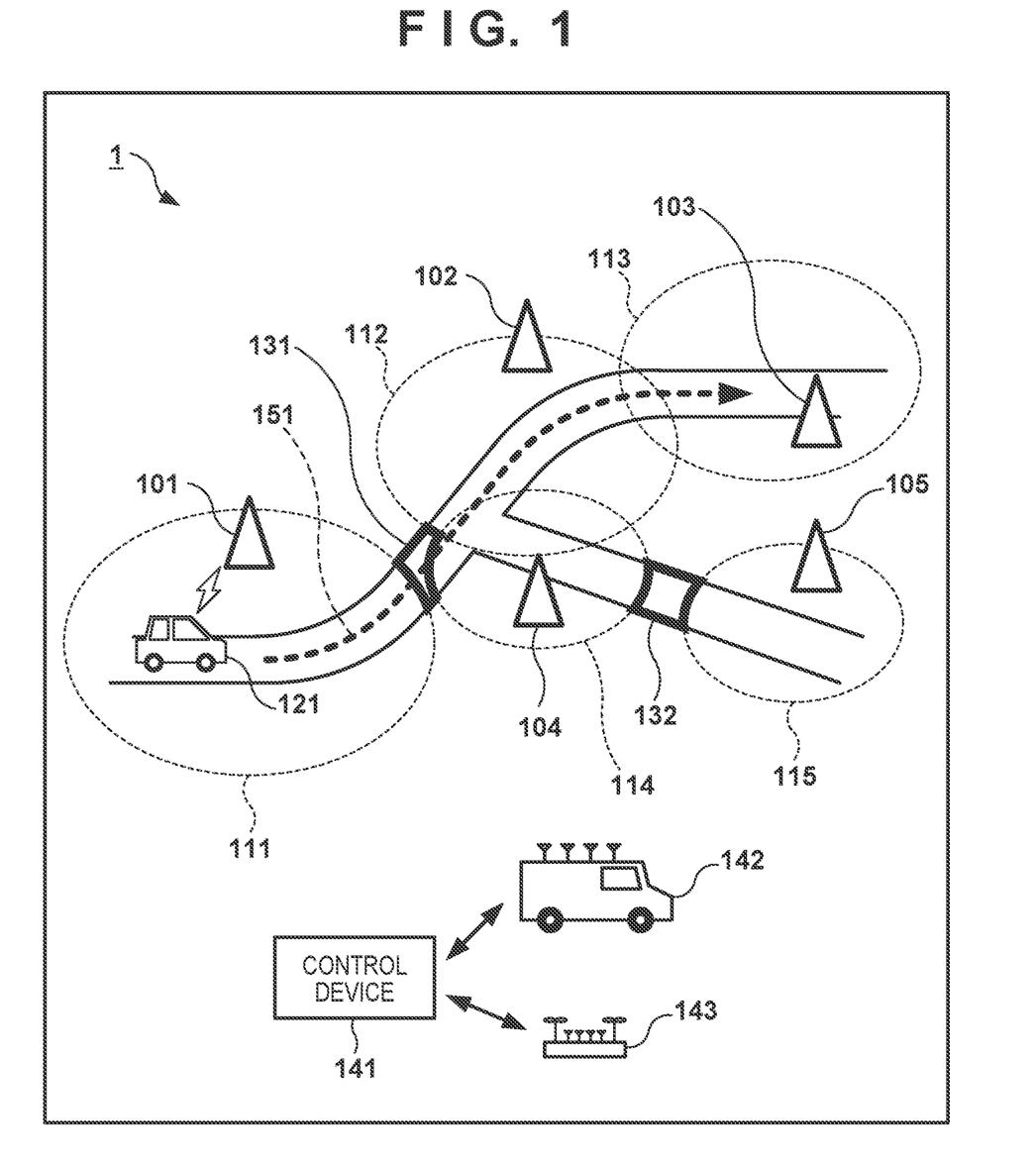
FIG. 1 is a diagram illustrating a system configuration example.

FIG. 1 illustrates a configuration example of a control system 1 according to the present embodiment. The control system 1 can be a system used to improve communication quality in a wireless communication system in which a communicable area is developed planarly, such as cellular wireless communication. Note that FIG. 1 illustrates an example on the premise of the cellular communication system, but a wireless LAN or another wireless communication system may be used. Note that the communication quality to be improved here can be represented by indices such as SNR (signal-to-noise power ratio), SINR (signal-to-interference plus noise power ratio), RSRP (reference signal received power), RSRQ (reference signal received quality), and received signal strength. The communication quality is evaluated to be improved when the value becomes large. Furthermore, the communication quality may be, for example, a communication delay between the terminal device and a communication partner device connected via a base station or a network, and in this case, it can be evaluated that the communication quality is improved by shortening the communication delay. Furthermore, the communication quality may be the degree of congestion of the base station, the use rate of the radio resources, or the like. In this case, it is evaluated that the communication quality is improved by eliminating the congestion or reducing the use rate of the radio resources. Furthermore, communication quality other than these may be a target of improvement.

The cellular communication system is configured such that each of a plurality of base stations (for example, a base station 101, a base station 102, a base station 103, a base station 104, and a base station 105) provides a wireless communication service to a terminal device with a range of a cell (for example, a cell 111, a cell 112, a cell 113, a cell 114, and a cell 115) formed by the base station itself as a communicable range. The terminal device may be, for example, an in-vehicle terminal device 121 mounted on a remote driving vehicle or an automated driving vehicle, but is not limited thereto. For example, a portable terminal device such as a smartphone, a tablet, or a notebook PC, a fixed terminal device, or the like can operate as a terminal device in the cellular communication system.

In a cellular communication system, a large number of base stations are arranged, and a cell formed by each of the base stations is arranged such that a part thereof overlaps with another cell, and thereby a planarly seamless wireless communication service is provided. However, even if the cell arrangement plan in which every region belongs to any cell is applied, there may be a region (for example, a region 131, a region 132) in which the communication quality is insufficient in the actual communication environment. For example, such a situation may occur in a case where radio waves attenuate more than expected due to an influence of a building and cannot cover a part of the region. In addition, in a case where a large number of terminal devices are concentrated in a relatively narrow region, available communication resources (for example, a frequency/time resource, a spatial resource, or an operation resource) are insufficient in the region, and deterioration of communication quality such as an increase in communication delay may occur.

In the present embodiment, a mobile base station (for example, a vehicle-type mobile base station 142, an automatic flying-body type mobile base station 143) is used to provide wireless communication with sufficient communication quality in such a region where the communication quality is not sufficient (for example, the region 131, the region 132). That is, in a case where there is a region having insufficient communication quality, the mobile base station is moved to a position where wireless communication can be provided in the region. This makes it possible to provide a high-quality wireless communication service to the terminal device in a region where a fixed base station cannot obtain sufficient communication quality.

On the other hand, the mobile base station needs fuel for moving to a position where a wireless communication service can be provided and a power source for providing a wireless communication service at the position. For this reason, it is not realistic to always provide high-quality wireless communication in a region where communication quality is insufficient. Therefore, the present embodiment provides a control technique for moving a mobile base station to an appropriate position in a timely manner. Such control is executed by a control device 141, for example. Note that, in one example, the control device 141 may be a network node in the core network or a management server of a network operator, but may be, for example, a third-party server connected to another network outside the core network. Furthermore, the control device 141 may be provided inside the mobile base station.

The control device 141 acquires the quality information indicating the correspondence relationship between the position and the communication quality related to the wireless communication and the route information indicating the scheduled moving route of the terminal device in order to enable the wireless communication in the necessary region in a timely manner. Then, on the basis of the quality information and the route information, the control device 141 specifies an area including at least a part of the scheduled moving route among areas in which the communication quality is determined to be lower than the predetermined communication quality. Then, the control device 141 performs control to move the mobile base station to a position where the wireless communication service can be provided in the specified area.

For example, the control device 141 collects quality information indicating a correspondence relationship between a position at which the wireless communication device has executed communication in the past and the communication quality at the position. Then, the control device 141 acquires, as the quality information, values such as an average value, a variance, a maximum value, a minimum value, and a distribution of values indicating the communication quality at each of a large number of positions obtained as a result of collecting a large number of pieces of information. On the basis of the communication quality in such past communication, the control device 141 determines an area in which the communication quality is predicted to be lower than the predetermined communication quality at the current time as an area in which the communication quality is lower than the predetermined communication quality. Furthermore, the control device 141 may acquire information regarding communication quality in communication executed during a predetermined period including the current time (hereinafter, this period may be referred to as "current"). Then, the control device 141 can determine an area in which the current communication quality is lower than the predetermined communication quality as an area in which the communication quality is lower than the predetermined communication quality.

In addition, the control device 141 acquires route information indicating a scheduled moving route 151 for the terminal device 121, for example. Note that the control device 141 can similarly acquire route information for other terminal devices, but here, for the sake of simplicity of description, description will be given focusing on only one terminal device 121. The control device 141 acquires, for example, information regarding a scheduled moving route set in an automated driving vehicle or a remote driving vehicle (or a remote driving operator device) as route information. Furthermore, the control device 141 may acquire information regarding a route set by a navigation application or the like of a smartphone, for example. Further, the control device 141 may acquire the distribution of the movement destinations of the terminal devices at future time as the route information on the basis of the distribution of the current terminal positions and the statistical values of the past paths of the terminal devices. That is, a map of the probability distribution of the position where the terminal is present may be acquired as the route information.

The control device 141 specifies an area including at least a part of the scheduled moving route of the terminal device indicated by the route information among areas in which the communication quality is determined to be lower than a predetermined communication quality. Then, the control device 141 executes control for moving the mobile base station to a position where the wireless communication service can be provided in the specified area. For example, in the example of FIG. 1, the region 131 and the region 132 are areas in which the communication quality is determined to be lower than a predetermined communication quality, but a part of the scheduled moving route 151 of the terminal device 121 is included in the region 131. Therefore, the control device 141 specifies the region 131 as an area including at least a part of the scheduled moving route of the terminal device indicated by the route information among the areas in which the communication quality is determined to be lower than a predetermined communication quality. Therefore, the control device 141 performs control for moving the mobile base station (the mobile base station 142 or the mobile base station 143) to a position where the wireless communication service can be provided in the region 131. At this time, the region 132 is also an area in which the communication quality is determined to be lower than a predetermined communication quality, but since it is not assumed that the terminal device 121 proceeds to this area, the control device 141 does not move the mobile base station to this area. As a result, the mobile base station can be moved to a necessary position in a timely manner on the basis of the scheduled moving route of the terminal device.

Note that the control device 141 may set, as the above-described processing target, only a terminal device that performs a predetermined type of communication, for example, control communication for an automated driving vehicle or a remote driving vehicle. Furthermore, for example, the control device 141 may determine the above-described predetermined communication quality on the basis of the content of communication executed by the terminal device. For example, a relatively high first communication quality can be determined as the predetermined communication quality for communication for remote driving control, and a second communication quality lower than the first communication quality can be determined as the predetermined communication quality for communication for automated driving control. In addition, for communication requiring real-time properties such as a call, for example, communication quality equivalent to the second communication quality may be determined as the predetermined communication quality, and for best effort type communication, third communication quality lower than the second communication quality may be determined as the predetermined communication quality. Note that the predetermined communication quality may not be defined for communication content for which high quality is not required, such as best effort type communication. Furthermore, the predetermined communication quality may be determined on the basis of the required quality corresponding to the type of the terminal device, such as setting the predetermined communication quality high for a terminal device that requests high-quality communication according to the type of the terminal device. As a result, the control device 141 can preferentially make the mobile base station head for an area with low communication quality in the scheduled moving route of the terminal device performing communication requiring high quality. Note that the control device 141 can prevent the mobile base station from heading for an area in which it is assumed that the predetermined communication quality cannot be satisfied even if the mobile base station is headed for the area. For example, in a case where it is assumed that wireless communication with a communication delay shorter than the required communication delay cannot be provided even if the mobile base station moves to a position where a wireless communication service can be provided in an area where the quality related to the communication delay is lower than the predetermined communication quality, the control device 141 can prevent the mobile base station from moving to the position. According to this, by not providing a wireless communication service with insufficient communication quality in an area in which sufficient communication quality cannot be obtained even if a mobile base station is used, the mobile base station can be moved to another area, and efficiency of the entire system can be improved.

As an example of control for moving the mobile base station, the control device 141 can output information indicating a position where the mobile base station is to be moved and provide the information to a network operator or the like that operates the mobile base station. In addition, the control device 141 can execute control to set a position where the mobile base station is to be moved as a destination. Note that the mobile base station may be an automated driving vehicle, a remote driving vehicle, or an automatic flying body that can automatically move, such as a drone. In this case, by executing control to set a destination in the mobile base station, the mobile base station can automatically move to a position where a wireless communication service in a region with insufficient communication quality can be provided. Note that the destination can be determined according to the characteristics of the mobile base station. That is, when the mobile base station is a vehicle having a base station function such as an automated driving vehicle, it is necessary to designate a position on a road or available for parking as a destination. On the other hand, in a case where the mobile base station is a flying body having a base station function such as an automatic flying body, it is not necessary to pay attention to the road and the position available for parking, but it is necessary to designate the latitude and longitude at which the mobile base station should stay in the air in consideration of the height of a building or the like. It is also necessary to designate height coordinates for the flying body. Therefore, the control device 141 determines and sets a destination suitable for the characteristics of the mobile base station. The control device 141 performs control to move the mobile base station to a position where a wireless communication service can be provided in a region by a predetermined time before a timing at which the terminal device passes through the region with insufficient communication quality along the scheduled moving route. That is, it is necessary for the mobile base station to be in a state of providing the wireless communication service in a region before the terminal device passes through the region with insufficient communication quality in a case where there is no mobile base station in the scheduled moving route. Therefore, the control device 141 can perform control to cause the mobile base station to arrive at the position where the wireless communication service can be provided on the basis of the timing at which the terminal device passes through the region and the time required for the mobile base station to transition to the state of starting the operation as the base station after moving to the predetermined position.

Hereinafter, the configuration and operation of the control device that executes such processing will be described.

(Device Configuration)

Figure 2:
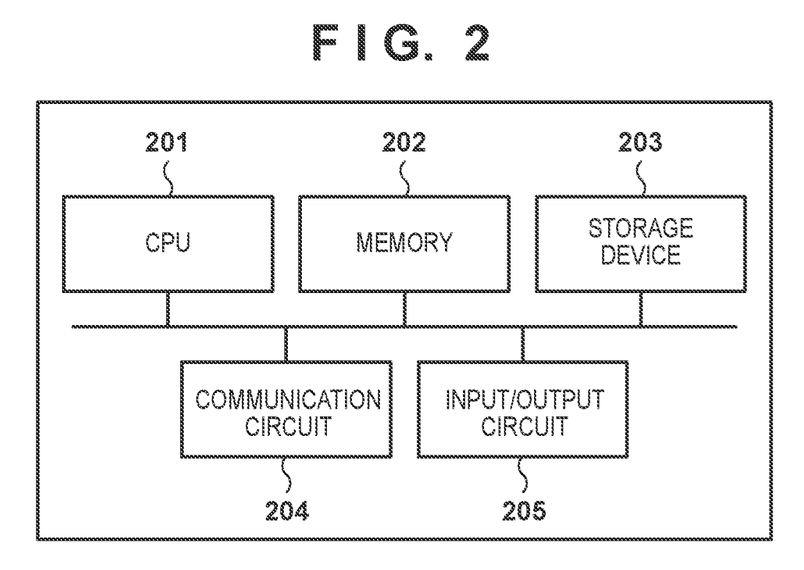
FIG. 2 is a diagram illustrating a hardware configuration example of a control device.

FIG. 2 illustrates a hardware configuration example of the control device 141 according to the present embodiment. The control device 141 is a general-purpose computer in one example, and includes, for example, a CPU 201, a memory 202, a storage device 203, a communication circuit 204, and an input/output circuit 205. The CPU 201 executes, for example, a program stored in the memory 202 to execute processing to be described later and control of the entire device. Note that the CPU 201 can be substituted by any one or more processors such as an MPU and an ASIC. The memory 202 holds a program for causing the control device 141 to execute various processes and functions as a work memory at the time of executing the program. In one example, the memory 202 is a random access memory (RAM) or a read-only memory (ROM). The storage device 203 is, for example, a detachable external storage device, a built-in hard disk drive, or the like, and holds various types of information. The communication circuit 204 executes signal processing related to communication, acquires various types of information from an external device through a communication network, and transmits various types of information to external devices. Note that the information acquired by the communication circuit 204 can be stored in, for example, the memory 202 or the storage device 203. Note that the control device 141 may include a plurality of communication circuits 204. The input/output circuit 205 controls, for example, output of screen information to be displayed on a display device (not illustrated) or audio information to be output from a speaker, and reception of user input via a keyboard, a pointing device, or the like. Note that the input/output circuit 205 may control a device that integrally performs input/output of a touch panel or the like.

Note that the configuration of FIG. 2 is an example, and for example, the control device 141 may be configured by dedicated hardware for executing the above-described processes.

Figure 3:
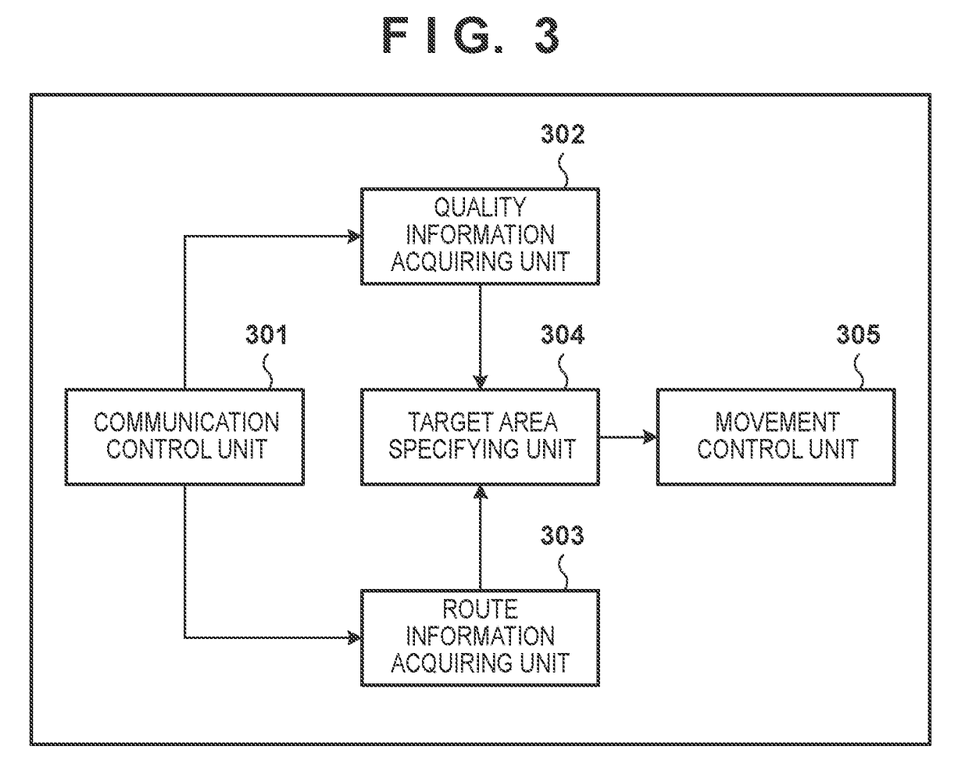
FIG. 3 is a diagram illustrating a functional configuration example of a control device.

FIG. 3 illustrates a functional configuration example of the control device 141 of the present embodiment. In one example, the control device 141 includes a communication control unit 301, a quality information acquiring unit 302, a route information acquiring unit 303, a target area specifying unit 304, and a movement control unit 305. The communication control unit 301 controls communication with a device outside the control device 141 or a device including the control device 141. For example, the communication control unit 301 performs control for executing communication with a base station or a network node of the cellular communication system. Furthermore, in a case where the control device 141 is included in a base station or a network node, the control device 141 can perform control for executing communication with the terminal device. Furthermore, the communication control unit 301, for example, in a case of executing remote control of the mobile base station, can execute communication with the mobile base station on the basis of, for example, a cellular communication system. The quality information acquiring unit 302 acquires quality information indicating a correspondence relationship between a position and communication quality when the communication device has performed wireless communication in the cellular communication system at present or in the past.

The quality information acquiring unit 302 can acquire quality information indicating a correspondence relationship between the position of the communication device and the communication quality from, for example, a base station that can directly communicate with the communication device and acquire a measurement value of the communication quality or a network node that comprehensively manages the communication quality in the cellular communication system. The communication quality is SNR, SINR, RSRP, RSRQ, a communication delay, the number of terminal devices in communication (congestion degree), a use rate of radio resources, and the like, and one or more of them can be acquired by the quality information acquiring unit 302. In addition, the quality information acquiring unit 302 may acquire the quality information by acquiring a sample value of the communication quality and calculating a value indicating the communication quality to be actually used, such as a statistical value.

The route information acquiring unit 303 acquires information on a scheduled moving route of the terminal device. The route information acquiring unit 303 can acquire route information indicating a scheduled moving route of the vehicle from, for example, a terminal device mounted on an automated driving vehicle or a remote driving vehicle or a terminal device such as a smartphone that is executing a navigation application. In addition, for example, the route information acquiring unit 303 may estimate the position of the terminal device in the future from the distribution of the current position of the terminal device and the statistical value of the past moving route, and collectively estimate the scheduled moving routes of the plurality of terminals.

On the basis of the quality information acquired by the quality information acquiring unit 302, the target area specifying unit 304 specifies a first area whose communication quality is lower than a predetermined communication quality. Note that the predetermined communication quality can be adaptively determined according to the content of communication executed by the terminal device. Furthermore, the predetermined communication quality may be adaptively determined on the basis of the type of the terminal device. Then, on the basis of the route information acquired by the route information acquiring unit 303, the target area specifying unit 304 specifies a second area including at least a part of the scheduled moving route of the terminal device from among the first areas whose communication quality is lower than the predetermined communication quality.

The movement control unit 305 executes control for moving the mobile base station to a position where the mobile base station can provide a wireless communication service in the second area. This control may be, for example, control of outputting information indicating a position where the mobile base station can provide the wireless communication service in the second area. That is, the control device 141 is used for, for example, an information providing service for a network operator, and can perform control for presenting a position where the mobile base station is to be moved to the network operator. Furthermore, this control may be control for setting a destination of the mobile base station, for example, in a case where the mobile base station is an automated driving vehicle, a remote driving vehicle, or an automatic flying body that can automatically move. Furthermore, this control may be, for example, control of presenting a position to move the mobile base station to the user of the control device 141 via the input/output circuit 205. In this case, the user may manually set the presented position in the mobile base station. That is, in the control here, various types of processes can be executed as long as the control is used to move the mobile base station to a position where the wireless communication service in the second area specified by the target area specifying unit 304 can be provided.

(Flow of Processing)

Figure 4:
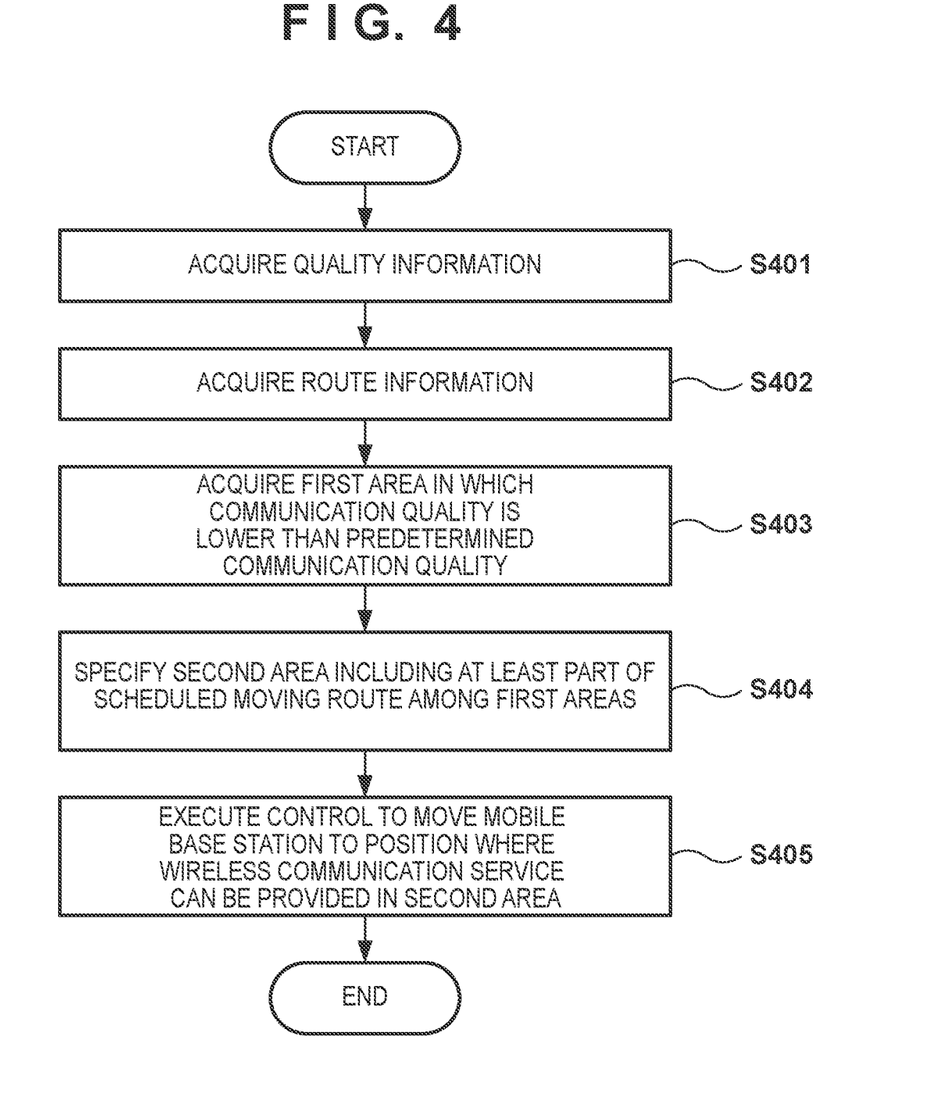
FIG. 4 is a diagram illustrating an example of a flow of processing executed by a control device.

Next, an example of a flow of processing executed by the control device 141 will be described with reference to FIG. 4. Note that, in one example, the CPU 201 of the control device 141 executes a program stored in the memory 202 to perform the present processing. Furthermore, in the control device 141, the present processing can be started by the user instructing the start of the processing, but the present processing may be always executed while the control device 141 is operating. Note that, in the following description, the details described above will not be repeated.

The control device 141 acquires the quality information indicating the correspondence relationship between a position of the communication device and the communication quality at the position and the route information indicating the scheduled moving route of the terminal device (S401, S402). Note that the control device 141 may acquire the route information only for a predetermined type of terminal device such as a terminal device mounted on a remote driving vehicle or an automated driving vehicle. In addition, for example, quality information regarding a predetermined position such as a road on which a remote driving vehicle or an automated driving vehicle is assumed not to pass may not be acquired. The control device 141 specifies a first area in which the communication quality is lower than the predetermined communication quality on the basis of the quality information (S403). Then, the control device 141 specifies a second area including at least a part of the scheduled moving route of the terminal device among the specified first areas further on the basis of the route information (S404), and executes control to move the mobile base station to a position where the wireless communication service can be provided in the second area (S405).

By the processing as described above, in a case where the scheduled moving route on which the terminal device is scheduled to move is a route passing through a region with insufficient communication quality, the mobile base station can be moved to a position where a wireless communication service can be provided in the region. As a result, it is possible to reduce the probability that the communication quality of the wireless communication by the terminal device becomes insufficient or the probability that the wireless communication cannot be performed on the scheduled moving route. Therefore, the terminal device can appropriately execute a control operation using wireless communication such as automated driving or remote driving.

Summary of Embodiment

1. The control device according to the above embodiment includes:

an acquiring unit configured to acquire quality information indicating a correspondence relationship between a position and a communication quality related to wireless communication at the position, and route information indicating a scheduled moving route of a terminal device;

a specifying unit configured to specify an area including at least a part of the scheduled moving route among areas in which the communication quality is determined to be lower than a predetermined communication quality on a basis of the quality information and the route information; and a control unit configured to execute control for moving a mobile base station to a position where a wireless communication service can be provided in the specified area.

According to this embodiment, since the mobile base station can provide the wireless communication service in the area with insufficient communication quality on the scheduled moving route of the terminal device, the communication quality in the area can be improved. As a result, in the terminal device, predetermined processing (for example, remote driving control and automated driving control) using wireless communication can be appropriately executed on the basis of high-quality wireless communication.

2. In the control device according to the first embodiment described above, the specifying unit determines an area in which the current communication quality is lower than the predetermined communication quality among areas including the scheduled moving route as an area in which the communication quality is lower than the predetermined communication quality.

According to this embodiment, it is possible to improve the radio quality in an area through which the terminal device is expected to pass among the areas in which the communication quality is actually determined to be insufficient.

3. In the control device according to the first embodiment described above, the specifying unit determines an area predicted to have a communication quality lower than the predetermined communication quality on a basis of the past communication quality among areas including the scheduled moving route as an area in which the communication quality is lower than the predetermined communication quality.

According to this embodiment, it is possible to improve the radio quality in an area through which the terminal device is expected to pass among areas in which the communication quality tends to be insufficient.

4. In the control device according to any one of the first to third embodiments, when it is predicted that a communication quality of a wireless communication service provided by the mobile base station in the specified area is lower than the predetermined communication quality, the mobile base station is not moved to a position where the wireless communication service can be provided in the specified area.

According to this embodiment, in a case where communication quality cannot be sufficiently improved in a certain area even if a mobile base station is used, the mobile base station can be moved to provide a wireless communication service in another area without providing a wireless communication service in the area. This makes it possible to effectively utilize the mobile base stations, the number of which is limited.

5. In the control device according to any one of the first to fourth embodiments, the predetermined communication quality is determined on a basis of content of communication executed by the terminal device.

According to this embodiment, it is possible to preferentially improve the communication quality using the mobile base station for an area in which the communication quality is insufficient on the scheduled moving route of the terminal device that performs communication of contents requiring particularly high-quality wireless communication. Similarly, improvement of communication quality using a mobile base station for an area with insufficient communication quality on a scheduled moving route of a terminal device that performs communication with low required quality is not prioritized, and such improvement of communication quality may not be performed in some cases. As a result, the mobile base station can be efficiently arranged.

6. In the control device according to any one of the first to fifth embodiments, the control unit outputs a position where a wireless communication service can be provided in the specified area as a destination of the mobile base station.

According to this embodiment, a position suitable for a mobile base station to provide a wireless communication service can be provided to a company that operates the mobile base station, or can be set in a control device in the mobile base station.

7. In the control device according to any one of the first to sixth embodiments, the communication quality is based on a current or past communication quality of a communication device at a position corresponding to the communication quality.

According to this embodiment, it is possible to execute control based on an actual communication log.

8. In the control device according to any one of the first to seventh embodiments, the mobile base station is an automated driving vehicle or a remote driving vehicle having a base station function.

According to this embodiment, the mobile base station can automatically move to the vicinity of the area where the communication quality is to be improved and autonomously provide the wireless communication service.

9. In the control device according to any one of the first to seventh embodiments, the mobile base station is an automatic flying body having a base station function.

According to this embodiment, the mobile base station can automatically move to the vicinity of the area where the communication quality is to be improved and autonomously provide the wireless communication service.

10. The control method according to the above embodiment is a control method executed by a control device, includes:

an acquisition step of acquiring quality information indicating a correspondence relationship between a position of a communication device and a communication quality related to wireless communication at the position, and route information indicating a scheduled moving route of a terminal device;

a specifying step of specifying an area including at least a part of the scheduled moving route among areas in which the communication quality is determined to be lower than a predetermined communication quality on a basis of the quality information and the route information; and a control step of executing control for moving a mobile base station to a position where a wireless communication service can be provided in the specified area.

According to this embodiment, since the mobile base station can provide the wireless communication service in the area with insufficient communication quality on the scheduled moving route of the terminal device, the communication quality in the area can be improved.

11. The program according to the above embodiment causes a computer included in a control device to execute control for:

acquiring quality information indicating a correspondence relationship between a position of a communication device and a communication quality related to wireless communication at the position, and route information indicating a scheduled moving route of a terminal device;

specifying an area including at least a part of the scheduled moving route among areas in which the communication quality is determined to be lower than a predetermined communication quality on a basis of the quality information and the route information; and moving a mobile base station to a position where a wireless communication service can be provided in the specified area.

According to this embodiment, since the mobile base station can provide the wireless communication service in the area with insufficient communication quality on the scheduled moving route of the terminal device, the communication quality in the area can be improved.

According to the present invention, communication with sufficient communication quality can be provided to a moving terminal device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A control device, comprising:
at least one processor circuit with a memory comprising instructions, when executed by the processor circuit, causes the at least one processor circuit to at least:
acquire quality information indicating a correspondence relationship between a position and a communication quality related to wireless communication at the position, and route information indicating a scheduled moving route of a terminal device;
specify an area including at least a part of the scheduled moving route among areas in which the communication quality is determined to be lower than a predetermined communication quality on a basis of the quality information and the route information; and
control for moving a mobile base station to a position where a wireless communication service can be provided in the specified area,
wherein when it is predicted that a communication quality of a wireless communication service provided by the mobile base station in the specified area is lower than the predetermined communication quality, the mobile base station is not moved to a position where the wireless communication service can be provided in the specified area.

2. The control device according to claim 1, wherein the instructions, when executed by the processor circuit, causes the at least one processor circuit to at least determine an area in which the current communication quality is lower than the predetermined communication quality among areas including the scheduled moving route as an area in which the communication quality is lower than the predetermined communication quality.

3. The control device according to claim 1, wherein the instructions, when executed by the processor circuit, causes the at least one processor circuit to at least determine an area predicted to have a communication quality lower than the predetermined communication quality on a basis of the past communication quality among areas including the scheduled moving route as an area in which the communication quality is lower than the predetermined communication quality.

4. The control device according to claim 1, wherein the predetermined communication quality is determined on a basis of content of communication executed by the terminal device.

5. The control device according to claim 1, wherein the instructions, when executed by the processor circuit, causes the at least one processor circuit to at least output a position where a wireless communication service can be provided in the specified area as a destination of the mobile base station.

6. The control device according to claim 1, wherein the communication quality is based on a current or past communication quality of a communication device at a position corresponding to the communication quality.

7. The control device according to claim 1, wherein the mobile base station is an automated driving vehicle or a remote driving vehicle having a base station function.

8. The control device according to claim 1, wherein the mobile base station is an automatic flying body having a base station function.

9. A control method executed by a control device, comprising:
acquiring quality information indicating a correspondence relationship between a position and a communication quality related to wireless communication at the position, and route information indicating a scheduled moving route of a terminal device;
specifying an area including at least a part of the scheduled moving route among areas in which the communication quality is determined to be lower than a predetermined communication quality on a basis of the quality information and the route information; and
executing control for moving a mobile base station to a position where a wireless communication service can be provided in the specified area,
wherein when it is predicted that a communication quality of a wireless communication service provided by the mobile base station in the specified area is lower than the predetermined communication quality, the mobile base station is not moved to a position where the wireless communication service can be provided in the specified area.

10. A non-transitory computer-readable storage medium that stores a program for causing a computer included in a control device to execute control for:
acquiring quality information indicating a correspondence relationship between a position and a communication quality related to wireless communication at the position, and route information indicating a scheduled moving route of a terminal device;

specifying an area including at least a part of the scheduled moving route among areas in which the communication quality is determined to be lower than a predetermined communication quality on a basis of the quality information and the route information; and moving a mobile base station to a position where a wireless communication service can be provided in the specified area, wherein when it is predicted that a communication quality of a wireless communication service provided by the mobile base station in the specified area is lower than the predetermined communication quality, the mobile base station is not moved to a position where the wireless communication service can be provided in the specified area.

* * * * *